United States Patent

Tashiro et al.

Patent Number: 5,107,240
Date of Patent: Apr. 21, 1992

[54] SUPERCONDUCTING TRANSFORMER

[75] Inventors: Ikuo Tashiro, Yokohama; Mituyoshi Morohoshi, Kawasaki; Eriko Shimizu, Tokyo; Daisuke Ito, Yokohama, all of Japan

[73] Assignee: Kabushiki Kaisha Toshiba, Kawasaki, Japan

[21] Appl. No.: 361,770

[22] Filed: May 30, 1989

Related U.S. Application Data

[63] Continuation-in-part of Ser. No. 120,607, Nov. 16, 1987, abandoned.

[30] Foreign Application Priority Data

Nov. 18, 1986 [JP] Japan .................. 61-272950

[51] Int. Cl.$^5$ .................. H01F 27/08; H01F 27/30
[52] U.S. Cl. .................. 336/60; 335/216; 336/83; 336/92; 336/197; 336/DIG. 1; 505/880
[58] Field of Search .................. 336/60, 198, 208, 197, 336/92, DIG. 1, 83, 212; 335/216; 505/879, 880

[56] References Cited

U.S. PATENT DOCUMENTS

| | | | |
|---|---|---|---|
| 2,114,031 | 4/1938 | Rust et al. | 336/83 X |
| 2,413,201 | 12/1946 | Tillman | 336/83 X |
| 3,173,079 | 11/1965 | McFee | |
| 3,273,099 | 9/1966 | Minks | 336/83 |
| 3,289,137 | 11/1966 | Jones et al. | 336/197 |
| 4,257,027 | 3/1981 | Yashuhisa | 336/208 |
| 4,449,111 | 5/1984 | Nakajima | 336/198 |
| 4,516,559 | 5/1985 | Oohashi | 336/83 X |
| 4,616,205 | 10/1986 | Praught et al. | 336/83 X |
| 4,675,637 | 6/1987 | Ferrier et al. | 336/60 |

FOREIGN PATENT DOCUMENTS

| | | | |
|---|---|---|---|
| 230801 | 9/1959 | Australia | 336/83 |
| 0111218 | 11/1983 | European Pat. Off. | |
| 2581473 | 5/1985 | France | |

OTHER PUBLICATIONS

H. Riemersma et al.: "Application of Superconducting Technology to Power Transformers" IEEE Trans. Power Apparatus Syst, PAS-100 No. 7, Jul. 1981.

Primary Examiner—Thomas J. Kozma
Attorney, Agent, or Firm—Oblon, Spivak, McClelland, Maier & Neustadt

[57] ABSTRACT

A superconducting transformer comprises primary and secondary superconducting coils which are coaxial and made of superconducting wires, and a cryostat for maintaining the superconducting coils in a superconducting state. The cryostat includes a vessel for containing refrigerant and which is formed of a ferromagnetic material. The coils are immersed in the refrigerant. Rod formed of ferromagnetic materials is inserted in the primary and secondary superconducting coils, and is magnetically coupled with the vessel. The cryostat also includes a heat insulating tank for thermally insulating the rod and the vessel from the refrigerant. The rod and the vessel together form a closed magnetic circuit, and function as a core for the superconducting coils.

16 Claims, 10 Drawing Sheets

SUPERCONDUCTING TRANSFORMER

This application is a continuation-in-part of application Ser. No. 120,607, filed on Nov. 16, 1987, now abandoned.

BACKGROUND OF THE INVENTION

The present invention relates to a superconducting transformer and, more particularly, to a superconducting transformer for transferring electric energy from a primary superconducting coil to a secondary superconducting coil by means of magnetic induction.

This superconducting transformer includes primary and secondary superconducting coils made of superconducting wires, a core a portion of which is coaxial with the coils, thereby forming a closed magnetic circuit, and a cryostat for maintaining the superconducting coils in a superconducting state. The superconducting coils and the core are immersed in a refrigerant, such as liquid helium, contained in the cryostat. More specifically, the superconducting coils are cooled by the refrigerant, thereby to be assume a superconducting state.

Superconducting wires in the superconducting state experience almost no hysteresis loss or coupling loss. That is, superconducting coils in the superconducting state experience almost no ohmic loss. Thus, a superconducting transformer can transfer a large quantity of electric energy from the primary coil to the secondary coil, with almost no AC loss.

However, even if it is not necessary to place the core in the superconducting state, the core is nevertheless immersed in the refrigerant. When the superconducting transformer is operated, Joule heat is generated from the core, due to the iron loss thereof. Thus, when the core is immersed in the refrigerant, a large quantity of refrigerant is heated by the Joule heat, with the result that the cooling efficiency of the superconducting coils is inevitably degraded. Consequently, it is necessary that the core be insulated from the refrigerant.

Figure 1:
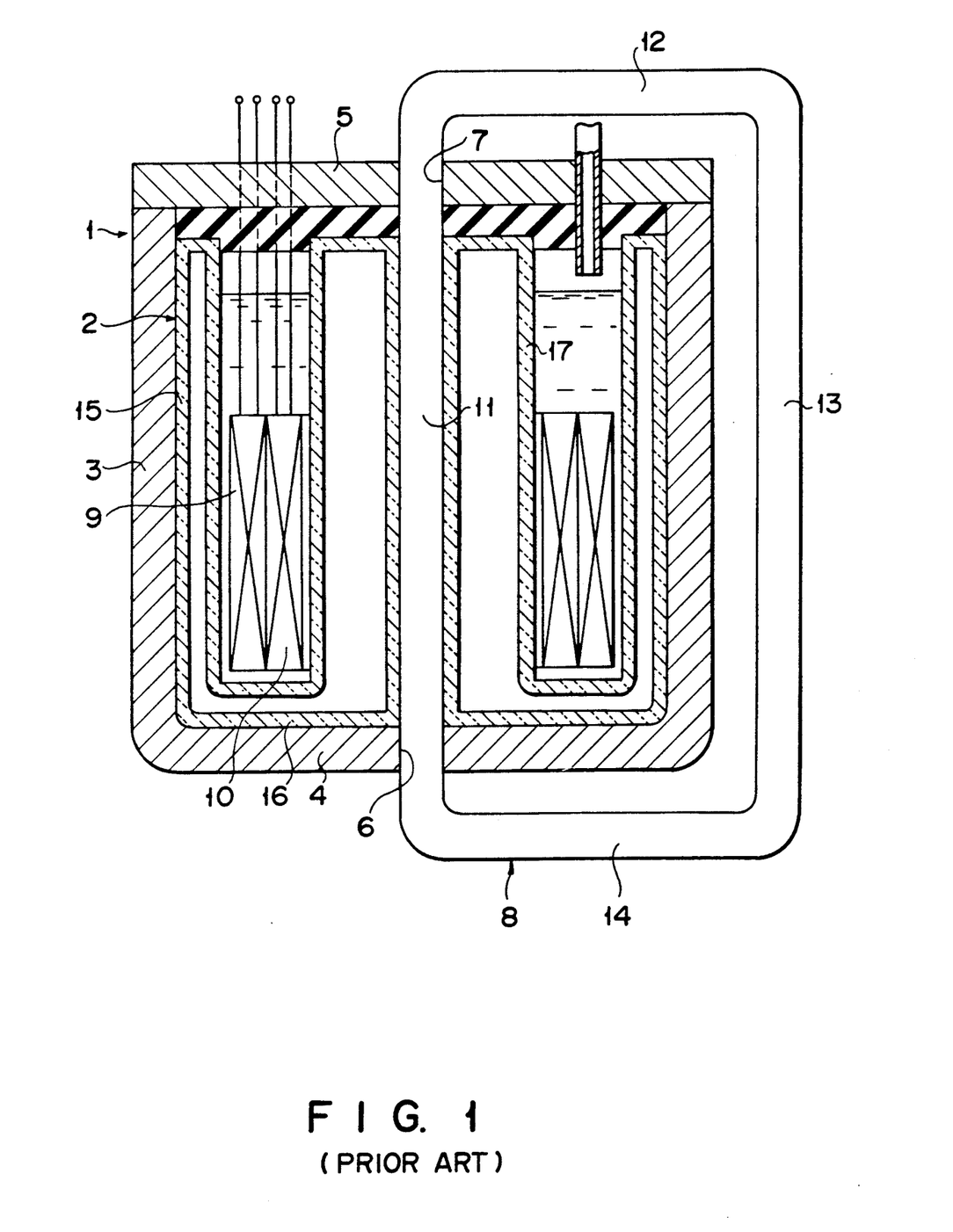
FIG. 1 is a sectional view showing a superconducting transformer according to prior art.

As is shown in FIG. 1, a superconducting transformer has been proposed which satisfies this requirement. A cryostat includes vessel 1, which contains heat insulating tank 2. Vessel 1 has annular side wall 3, bottom wall 4, and cover 5. Core 8 is annular in shape, is formed of a rod, and has first portion 11, second portion 12, third portion 13, and fourth portion 14. First portion 11 is inserted in opening 6 of bottom wall 4 and opening 7 of cover 5. Second to fourth portions 12 to 14 are located outside vessel 1. Heat insulating tank 2 has side 15 and bottom 16 extending along the inner surfaces of side wall 3 and bottom wall 4, respectively, and enclosure 17 extending along the outer periphery of first portion 11 of annular core 8. Primary and secondary superconducting coils 9 and 10 are provided which are coaxial with first portion 11 of annular core 8 and surround enclosure 17. Refrigerant is contained in heat insulating tank 8.

Therefore, superconducting coils 9 and 10 are magnetically coupled with first portion 11 of core 8. First portion 11 of core 8 is thermally insulated from the refrigerant by enclosure 17 of heat insulating tank 2, without coming into contact with the refrigerant. Second to fourth portions 12 to 14 of core 8 are located outside of vessel 1, and not in contact with the refrigerant. In this way, the requirement that the core be insulated from the refrigerant, is satisfied.

In the case of the superconducting transformer shown in FIG. 1, before core 8 is bent, it is passed through opening 6 of bottom wall 4, coils 9 and 10, enclosure 17, and opening 7 of cover 5. Thereafter, core 8 is bent annularly. Thus, after core 8 has been formed into an annular shape, it is then difficult to remove superconducting coils 9 and 10 therefrom, for maintenance. If it is necessary to remove superconducting coils 9 and 10 from annular core 8, core 8 must then be cut open. Consequently, maintenance and inspection of the superconducting coils cannot be performed with ease.

Since second to fourth portions 12 to 14 of core 8 are disposed outside the vessel, it is necessary to increase the mechanical strengths of the vessel and the heat insulating tank. Particularly, since the load of core 8 is applied to the upper and lower ends of enclosure 17 of heat insulating tank 2, the upper and lower ends of enclosure 17 must be formed rigidly. Thus, the thickness of enclosure 17 of heat insulating tank 2 is increased. Consequently, a space between superconducting coils 9, 10 and first portion 11 of core 8 is increased. Therefore, leakage magnetic flux radiated from superconducting coils 9, 10 through the space is increased. As a result, the transferring loss of the superconducting transformer is increased.

SUMMARY OF THE INVENTION

Accordingly, the object of the present invention is to provide a superconducting transformer in which a core is thermally insulated from a refrigerant, so as to prevent the temperature of the refrigerant from rising, in which a leakage magnetic flux from superconducting coils is reduced to minimize a transfer loss, and which is relatively easy to maintain.

In order to achieve the above object, the superconducting transformer according to the present invention comprises primary and secondary superconducting coils which are coaxial and made of wound superconducting wires, and a cryostat for maintaining the primary and secondary superconducting coils in a superconducting state. The cryostat includes a vessel which contains a refrigerant, into which the superconducting coils are immersed. This vessel has a first wall, a second wall disposed opposite to the first wall, and a third wall magnetically coupled with the first and second walls. The first, second, and third walls are formed of ferromagnetic materials. Rod formed of ferromagnetic materials are disposed to penetrate along the central axis of the primary and secondary superconducting coils. The rod is magnetically coupled at one end with the first wall of the vessel, and at the other end with the third wall thereof. The cryostat has heat insulating means for thermally insulating the refrigerant from the vessel and the rod.

The rod, the first, third, and second walls together form a closed magnetic circuit of the superconducting coils. Therefore, when a current is supplied to the primary superconducting coil, a magnetic flux is generated in a path of the rod, the first, third and second walls. As a result, an induced current is generated in the second superconducting coil. In other words, the rod, the first, third, and second walls operate as a core.

In the superconducting transformer of the present invention, the core, i.e., the rod, and the first, third and second walls are thermally insulated from the refrigerant. Therefore, the Joule heat generated in the core cannot be transferred to the refrigerant, and thus the refrigerant is not heated. Consequently, the cooling efficiency of the superconducting coil does not decrease.

Since the core is not disposed outside of the vessel, the mechanical strength of the vessels and the heat insulating means does not have to be high. In particular, the thickness of a member for thermally insulating the rod from the refrigerant can be reduced, and thus the spacing between the rod and the superconducting coils can be reduced, as compared with the case of the conventional superconducting transformer. As a result, the quantity of leakage magnetic flux radiated from the superconducting coils may be reduced, as can the transfer loss of the superconducting transformer.

In a preferred embodiment of the present invention, the vessel comprises a vessel body which has a detachable cover and the cover has the first wall. Thus, when the cover is removed from the vessel body, the superconducting coils are raised along the rod, and may then be removed from the vessel body. Therefore, unlike in the case of the conventional superconducting transformer, it is not necessary to cut the annular core. Consequently, maintenance and inspection of the superconducting transformer can be performed more readily, as compared with the conventional transformer.

DETAILED DESCRIPTION OF THE PREFERRED EMBODIMENTS

Figure 2:
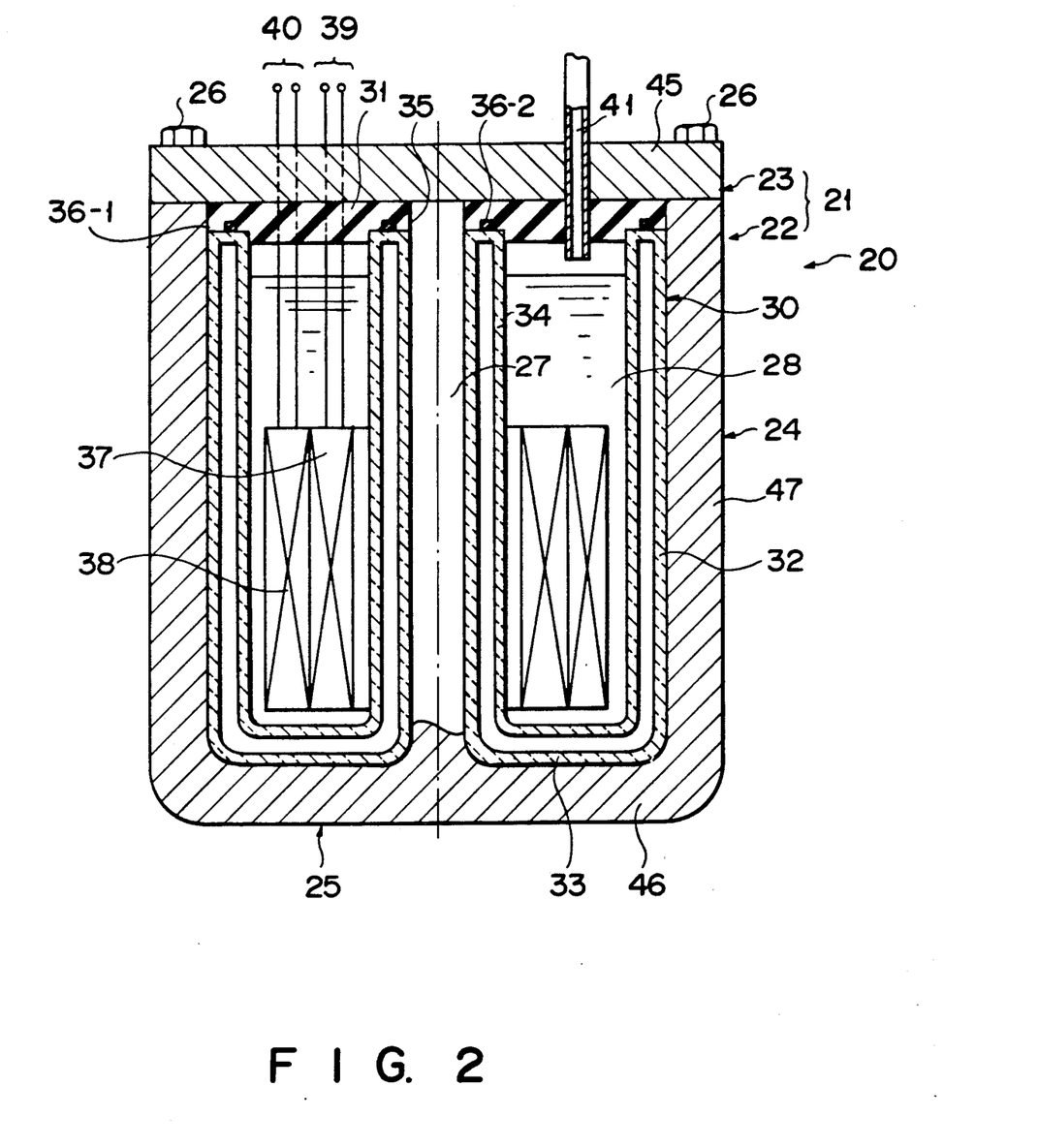
FIG. 2 is a sectional view showing a superconducting transformer according to a first embodiment of the present invention.

FIG. 2 shows a superconducting transformer according to a first embodiment of the present invention. This superconducting transformer includes cryostat 20 having vessel 21. Vessel 21 has vessel body 22 for containing refrigerant 28, and cover 23 provided detachably to vessel body 22. Vessel body 22 includes annular side wall 24 having openings at upper and lower ends. Disc-like bottom wall 25 disposed oppositely to cover 23 is integrally formed with side wall 24 to close the opening at the lower end of side wall 24. Disc-like cover 23 is attached to the upper end of side wall 24 by bolts 26 to close the opening at the upper end of side wall 24. Rod 27 is extended upward from the center of bottom wall 25. This rod 27 is formed integrally with bottom wall 25. The upper end of rod 27 is contacted with the center of cover 23. In other words, the upper end of rod 27 is magnetically coupled with cover 23. Vessel 21, i.e., vessel body 22 and cover 23 are formed, for example, of ferromagnetic material such as silicon steel. Thus, as will be described, rod 27, cover 23, sidewall 24, and bottom wall 25 form a closed magnetic circuit to operate as a core.

Cryostat 20 has heat insulating means for thermally insulating rod 27 and vessel 21 from refrigerant 28. The heat insulating means has heat insulating tank 30 disposed along the inner surface of vessel body 22, and heat insulating plate 31 disposed under the inner surface of cover 23. Heat-insulating tank 30 has annular side 32 opened at upper and lower ends and disposed along the inner surface of sidewall 24 of vessel body 22. Bottom 33 disposed along the inner surface of bottom wall 25 of vessel body 22 and closing the opening of the lower end of side 32 is formed integrally with side 32. Enclosure 34 disposed along the outer periphery of rod 27 is formed integrally with bottom 33. Portions 32 to 34 of heat insulating tank 30 are formed of double walls formed of FRP (glass fiber reinforced vinyl polyester resin). A vacuum space is defined between the double walls.

Heat insulating plate 31 is fixed to upper ends of side 32 and enclosure 34 to close the opening of the upper end of side 32. The upper end of rod 27 is inserted into opening 35 formed at the center of heat insulating plate 31. Two 0-rings 36-1, 36-2 are provided under the lower surface of heat insulating plate 31. O-rings 36-1, 36-2 seal the interior of heat insulating tank 30 from the exterior.

Refrigerant 28, such as liquid helium, liquid nitrogen, liquid hydrogen or liquid oxygen is contained in vessel 21, i.e., in heat insulating tank 30.

The superconducting transformer comprises primary and secondary superconducting coils 37 and 38 which are coaxial. Rod 27 is inserted into primary and secondary superconducting coils 37 and 38. In other words, rod 27 is located coaxially with of superconducting coils 37 and 38. Superconducting coils 37 and 38 surrounds enclosure 34 of heat insulating tank 30, and immersed in refrigerant 28. More specifically, superconducting coils 37 and 38 are provided in an annular space defined by side 32 and enclosure 34 of heat insulating tank 30. Superconducting coils 37 and 38 are formed by winding superconducting wires. The ends of the wound superconducting wires of primary superconducting coil 37 are connected to current lead wires 39 for supplying a current. The ends of wound superconducting wires of secondary superconducting coil 38 are connected to current lead wires 40 from which a current is output.

Pipe 41 is inserted through cover 23 and heat insulating plate 31 and opened in heat insulating tank 30. Refrigerant 28 gasified in heat insulating tank 30 is exhausted through pipe 41. Refrigerant 28 is led to cooler (not shown) to cool to be liquified. Liquified refrigerant 28 is fed through pipe 41 again to heat insulating tank 30.

When cover 23 is attached to the upper ends of side wall 24 and rod 27 by bolts 26, vessel body 22 and rod 27 form a closed magnetic circuit. In other words, a current flows through current lead wires 39 to primary superconducting coil 37. Thus, as designated by broken lines in FIG. 3, a magnetic flux is generated in a passage of rod 27, cover 23, side wall 24 and bottom wall 25. Consequently, an induced current is generated in second superconducting coil 37. Therefore, rod 27, cover 23, side wall 24 and bottom wall 25 operate as a core.

Figure 3:
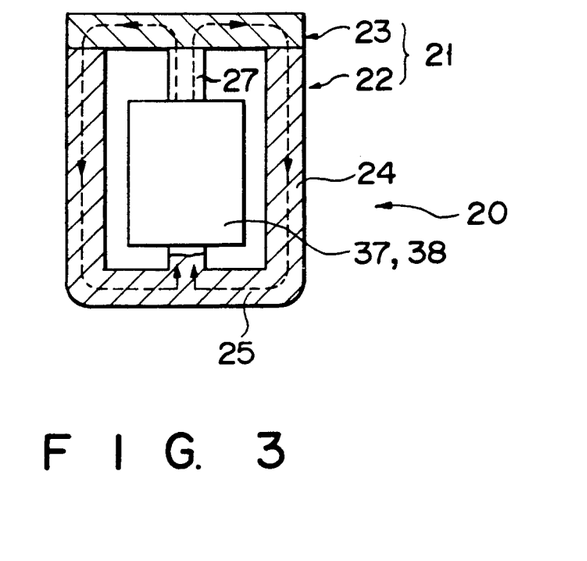
FIG. 3 is a sectional view schematically showing the superconducting transformer in FIG. 2 and the direction of a magnetic flux generated in a core.

At this time, rod 27, cover 23, side wall 24 and bottom wall 25, i.e., core generates Joule heat due to iron loss. However, rod 27, cover 23, side wall 24 and bottom wall 25 are thermally insulated from refrigerant 28 by heat insulating tank 30 and heat insulating plate 31. Thus, the Joule heat is not transferred to the refrigerant, so that a large quantity of refrigerant 28 is prevented from rising at its temperature. Therefore, the cooling efficiency of superconducting coils does not decrease.

The core is not arranged outside of the vessel as the conventional superconducting transformer. Thus, the vessel and the heat insulating tank are not required for high mechanical strengths. In other words, the upper and lower ends of rod 27 are supported by cover 23 and bottom wall 25. Thus, the load of rod 27 is not almost applied to enclosure 34 of heat insulating tank 30. Therefore, the thickness of enclosure 34 may be reduced. Thus, space between superconducting coils 37 and 38 and rod 27 may be small. Consequently, the leakage magnetic flux radiated from superconducting coils 37 and 38 through the space is reduced. Therefore, the transfer loss of the superconducting transformer is reduced as compared with the conventional superconducting transformer.

Figure 4:
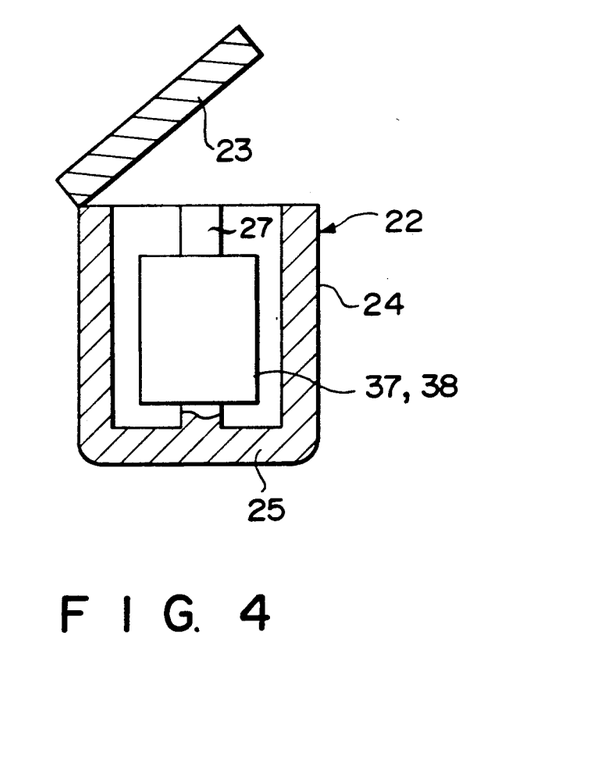
FIG. 4 is a sectional view schematically showing the superconducting transformer in FIG. 2 and the state that a cover is removed from a vessel body.

As shown in FIG. 4, cover 23 is not fixed to rod 27, and can be removed from the upper end Of side wall 24. Thus, superconducting coils 37 and 38 are raised along the outer periphery of enclosure 34 to be removed outside. In other words, the superconducting coils can be removed, without cutting the core. Consequently, the maintenance and the inspection of the superconducting transformer is readily performed.

The superconducting transformer of the present invention is reduced in the weight and volume in accordance with the reduced amounts of the thicknesses of second to fourth portions 12 to 14 and heat insulating tank 30 of the conventional core.

According to the present invention, it is not necessary to form the entire vessel 21 of ferromagnetic material. In other words, the predetermined portion of the vessel may be formed of ferromagnetic material, and may form a closed magnetic circuit. For example, as shown in FIG. 2, the right half (first wall 45) of cover 23, the right half (second wall 46) of bottom wall 25, and the right side (third wall 47) of side wall 34 may be formed of ferromagnetic materials. In this case, rod 27, first wall 45, third wall 47 and second wall 46 form a magnetic circuit and operate as a core.

Figure 5:
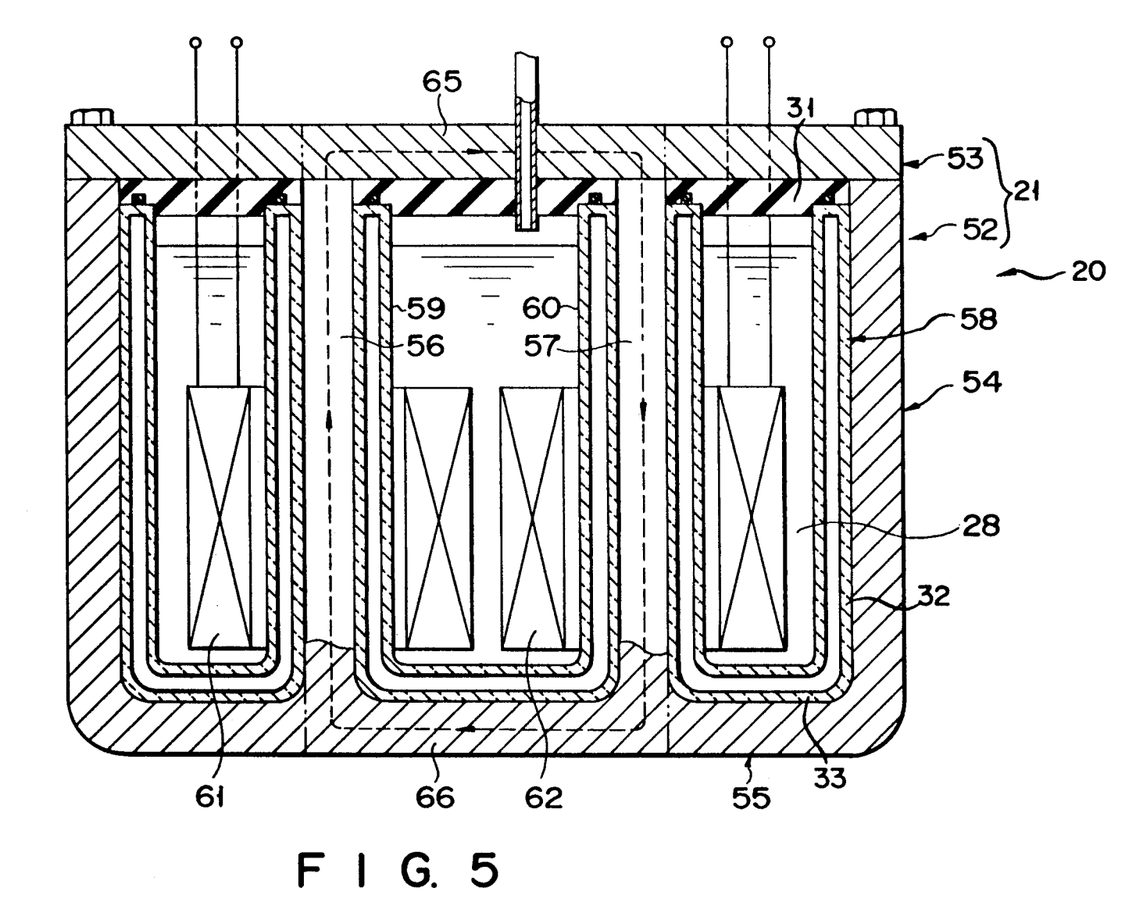
FIG. 5 is a sectional view of a superconducting transformer according to a second embodiment of the present invention.

A second embodiment of the present invention will now be described. In the second embodiment, primary superconducting coil 61 and secondary superconducting coil 62 are separately disposed. In FIG. 5, two rods 56, 57 are extended upward from bottom wall 55 of vessel body 52. The upper ends of two rods 56 and 57 are contacted with cover 53, to be magnetically coupled with cover 53. Heat insulating tank 58 has two enclosures 59 and 60 disposed along the outer peripheries of rods 56 and 57. Rods 56 and 57 are thermally insulated from refrigerant 28 by enclosures 59 and 60. The central axes of primary and secondary superconducting coils 61 and 62 are disposed coaxially with rods 56 and 57, respectively. Superconducting coils 61 and 62 are disposed radially outward of enclosures 59 and 60, and immersed in refrigerant 28. Therefore, even in this second embodiment, two rods 56, 57, cover 53, side wall 54 and bottom wall 56 form a magnetic circuit and operate as a core.

In the second embodiment described above, the magnetic flux flowing to the outer periphery of cover 53, side wall 54 and the outer periphery of bottom wall 55, does not generate induced current in secondary superconducting coil 62, and is wasteful magnetic flux. Thus, in the second embodiment, outer portion of cover 53 (i.e., that portion is other than the center portion), side wall 54 and outer portion of bottom wall 55 (i.e., that portion is other than the center portion) are preferably formed of a substance having low magnetic permeability.

Therefore, in the second embodiment, the center portion (first wall 65) of cover 53, and the center portion (second wall 66) of bottom wall 55 may be formed of ferromagnetic materials. In this case, rod 56, first wall 65, rod 57 and second wall 66 form a magnetic circuit, and operate as a core as shown by broken line in FIG. 5.

The present invention is not limited to the particular embodiments described above. In the embodiments, the upper end of the rod is contacted with the cover, and the lower end of the rod is formed integrally with the bottom wall. However, the ends of the rod may be magnetically coupled with the cover or the bottom wall. The refrigerant is not limited to the liquid helium, and may be any substance which may maintain the superconducting coils in superconducting state.

Figure 6:
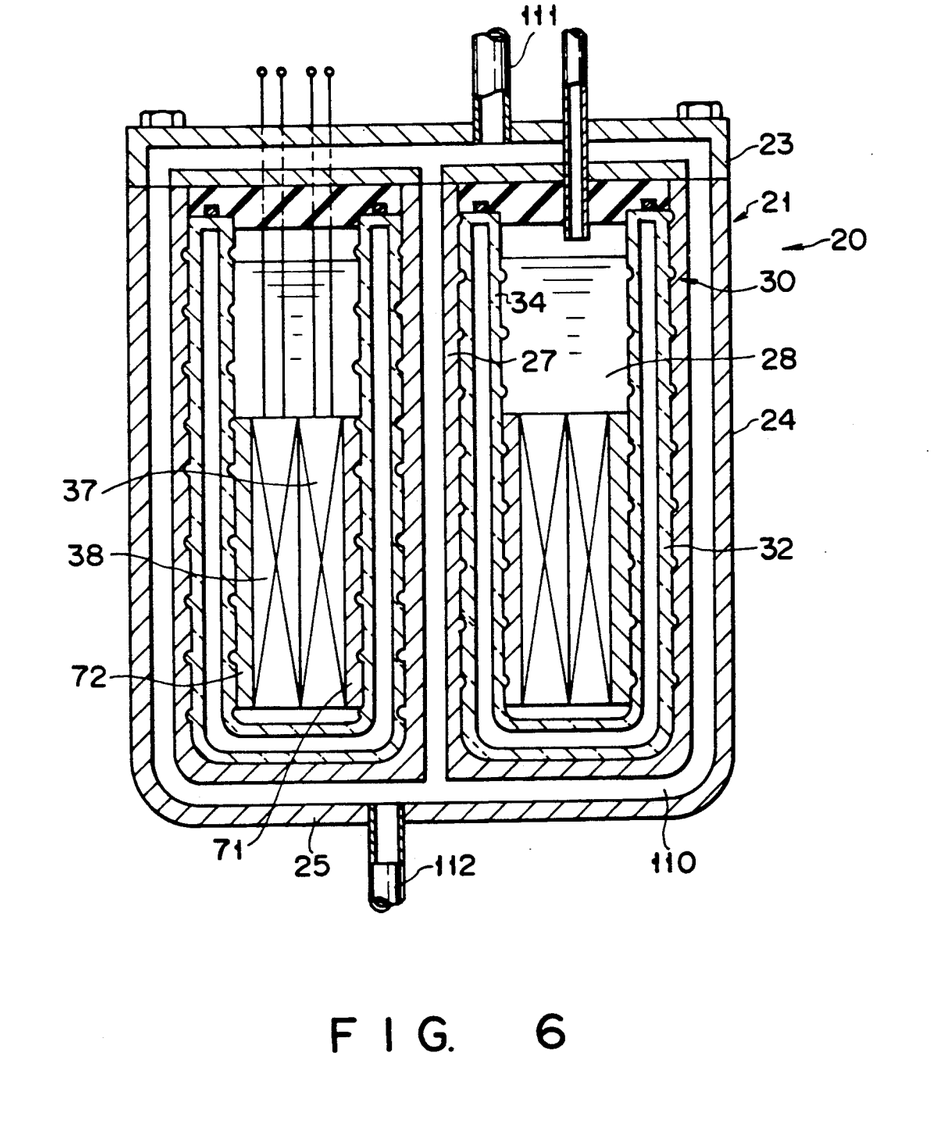
FIG. 6 is a sectional view showing a superconducting transformer according to a further embodiment of the present invention.

As is shown in FIG. 6, the superconducting transformer is provided with first and second superconducting coils 37 and 38 and cryostat vessel 20. Cryostat vessel 20 includes: main vessel 21 having rod 27, annular side wall 24, bottom wall 25, and cover wall 23; and heat insulating tank 30 located within main vessel 21.

Figure 7:
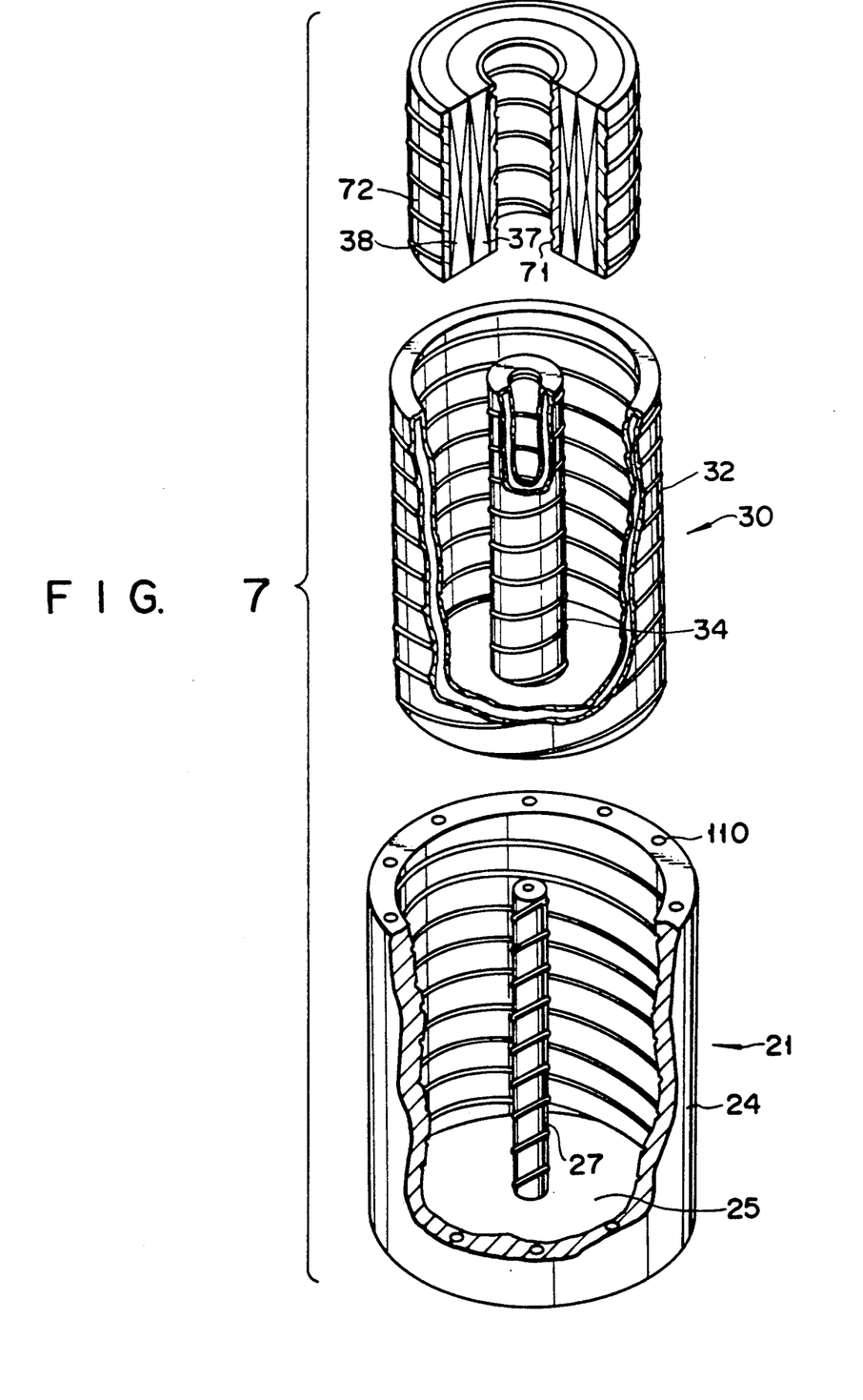
FIG. 7 is an exploded partially fragmentary view of elements of the superconducting transformer shown in FIG. 6.

As is shown in FIG. 7, main vessel 21 and tank 30 are detachable from each other, and tank 30 and superconducting coils 37 are also detachable from each other.

More specifically, first cylindrical member 71 formed of a non-magnetic material is arranged inside superconducting coils 37, and second cylindrical member 72 formed also of a non-magnetic material is arranged outside superconducting coils 38. The inner wall of first cylindrical member 71 has female screw portions, and the outer wall of second cylindrical member 72 has male screw portions.

Annular side portion 32 of heat insulating tank 30 has female and male screw portions formed in its inner and outer walls, respectively. Likewise, enclosure portion 34 of tank 30 has female and male screw portions formed in its inner and outer walls, respectively.

Further, the outer wall of rod 27 of main vessel 21 has female screw portions, and the inner wall of annular side wall of vessel 21 has male screw portions.

Tank 30 is secured to main vessel 21 by threadably fitting its male screw portions in the female screw portions of vessel 21. Coils 37 and 38 are immovably secured to tank 30 by threadably fitting the screw portions of first and second cylindrical members 71 and 72 with reference to those of tank 30.

When the superconducting transformer is in use, superconducting coils 37 and 38 generate an intense electromagnetic force, particularly in the radial directions of the coils. Since the electromagnetic force may cause movement of coils 37 and 38, resulting in quenching. coils 37 and 38 are immovably secured to tank 30 in the present invention. Even if the electromagnetic force is extremely large, coils 37 and 38 remain secured to tank 30. Thus, the occurrence of quenching is reliably prevented.

Coils 37 and 38 are detached from tank 30 by simply disengaging the male and female screw portions of first and second cylindrical members 71 and 72 from those of tank 30. This construction enables each coil replacement and is therefore advantageous, for example when the transformer is tested. In addition, the coils are easy to maintain since they can be detached from tank 30, for checking. Further, tank 30 is also easy to maintain since it can be detached from main vessel 21.

As is shown in FIG. 6, refrigerant passage 110 is defined by rod 27, annular side wall 24, bottom wall 25 and cover wall 23 of main vessel 21. Inlet port 111 for introducing refrigerant into passage 110 is formed in cover wall 23, and outlet port 112 for discarding the refrigerant is formed in bottom wall 25. Water, liquid nitrogen, or liquid helium may be used as the refrigerant.

Walls 23-25 and rod 27 generate heat since they serve as a core of coils 37 and 38. This heat is absorbed by the refrigerant flowing through passage 110, so that walls 23-25 and rod 27 can be kept cooled.

Figure 8:
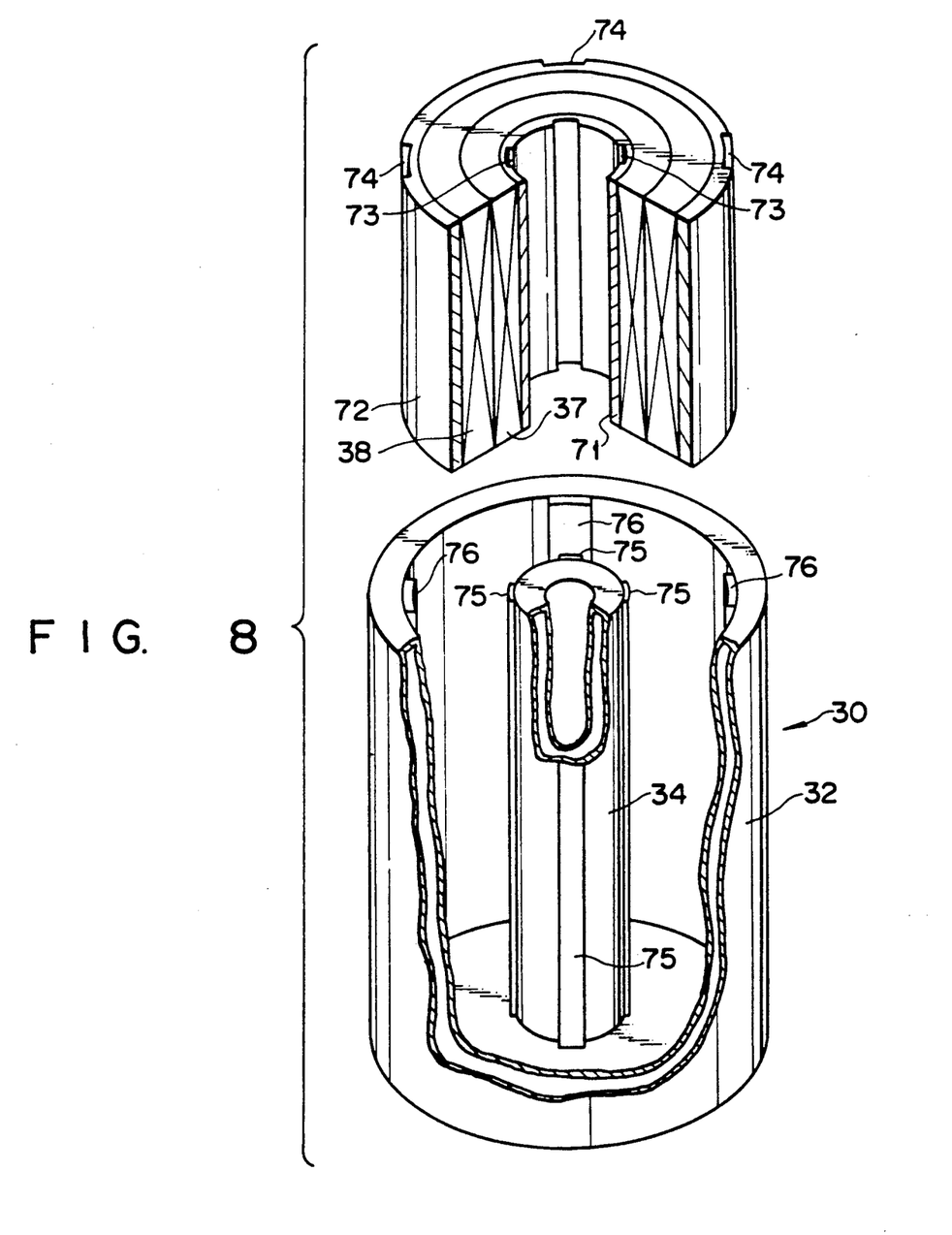
FIG. 8 is an exploded partially fragmentary view of elements of a modification of the superconducting transformer of the present invention.

FIG. 8 illustrates a further modification of the superconducting transformer of the present invention. According to this modification, the inner circumference of first cylindrical member 71 of coil 37 is brought into tight contact with the outer circumference of enclosure portion 34 of tank 30, and the outer circumference of second cylindrical member 72 of coil 38 is brought into tight contact with the inner circumference of annular side portion 32 of tank 30. Straight guide grooves 73 ar formed in he inner circumference of first cylindrical member 71, and straight guide grooves 74 are formed in the outer circumference of second cylindrical member 72. Straight ridges 75 which are engageable with guide grooves 73 are formed on the outer circumference of enclosure portion 34, and straight ridges 76 which are engageable with guide grooves 74 are formed on the inner circumference of annular side potion 32. The guide grooves and ridges do not have to be straight; they may be formed in a spiral pattern, if so desired.

Coils 37 and 38 are inserted into tank, with ridges 75 and 76 being guided along guide grooves 73 and 74. After being inserted, coils 37 and 38 are secured within tank 30 in such a manner that they cannot be moved in the radial direction of tank 30. Therefore, even if an intense electromagnetic force acts in the radial direction of tank 30, coils 37 and 38 do not move in the radial direction. If necessary, axial movement of coils 37 and 38 can be prevented by use of a ratchet mechanism (not shown).

Coils 37 and 38 can be easily detached from tank 30 by pulling them away from tank 30, with ridges 75 and 76 guided along guide grooves 73 and 74. Therefore, the coils can be easily maintained or replaced with new ones.

Figure 9:
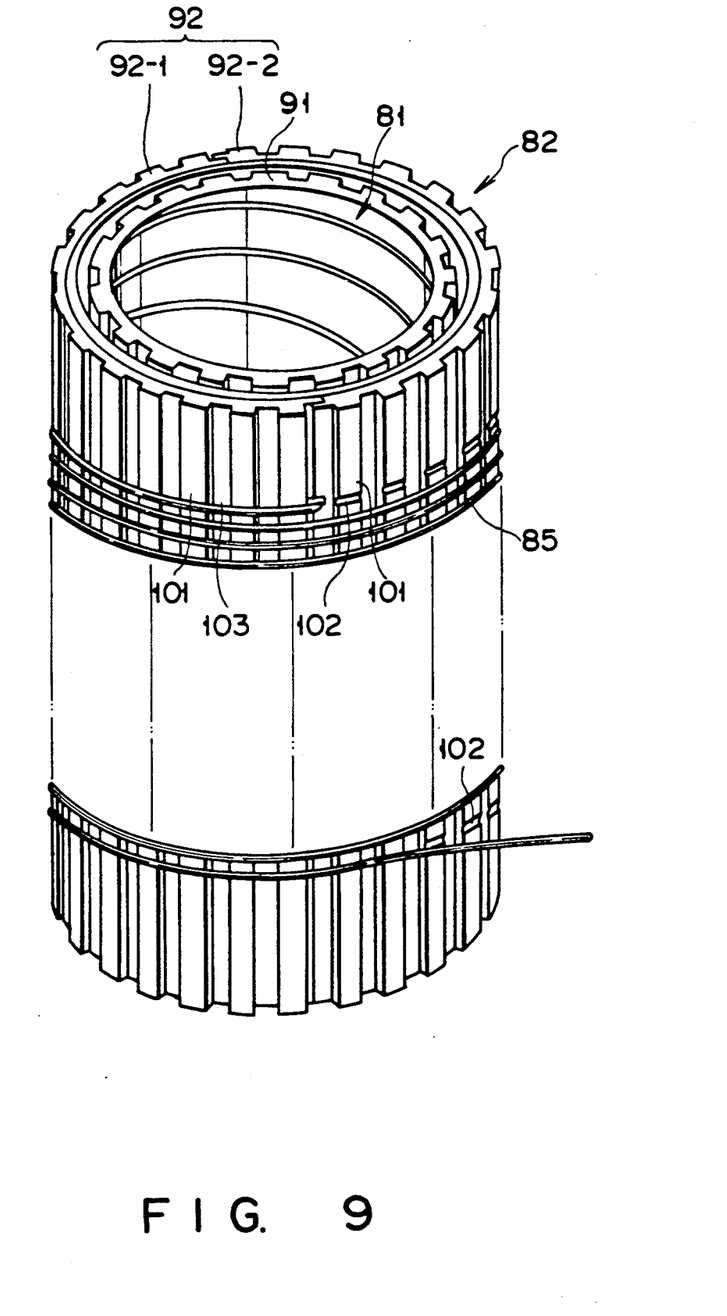
FIGS. 9 and 10 are perspective views illustrating the construction of the superconducting coil of the transformer of the present invention.
Figure 10:
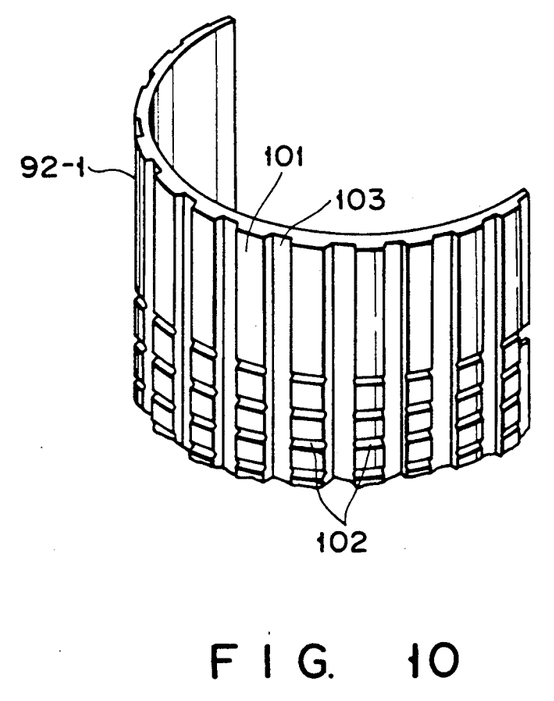

FIGS. 9 and 10 illustrate the construction of the superconducting coil. As is illustrated, the superconducting coil is made up of a plurality of coil units, and each coil unit comprises a non-magnetic cylindrical former, and windings obtained by spirally winding superconducting wires around the cylindrical former.

As is shown in FIG. 8, first former 91 of first coil unit 81 located most inwardly is a cylindrical member. However, second former 92 of second coil unit 82 located around first coil unit 81 is made up of two semicircular former segments 92-1 and 92-2. More specifically, second former 92 is obtained by assembling the former segments with their circumferential ends overlapping with each other. Although not shown, the formers of the other coil units arranged around second coil unit 82 have similar constructions to that of second former 92.

To fabricate the superconducting coil shown in FIG. 9, windings are formed around first former 91, thereby forming first coil unit 81. Thereafter, two former segments 92-1 and 92-2 are assembled together to constitute second former 92, and second windings 85 are formed around second former 92, thereby forming second coil unit 82. In this fashion, the superconducting coil can be easily fabricated.

A spiral groove for receiving superconducting wires therein is formed in the outer circumference of each former. The spiral groove is formed by providing a plurality of recess portions 102 in the ridges of each former. With this construction, the superconducting wires are prevented from slipping on the outer circumference of each former, and also the occurrence of quenching is prevented.

The adjacent ridges of each of first and second formers 91 and 92 define axially-extending channel 103 therebetween. Channels 103 serve as refrigerant passages, along which refrigerant is made to flow for cooling the windings.

Figure 11:
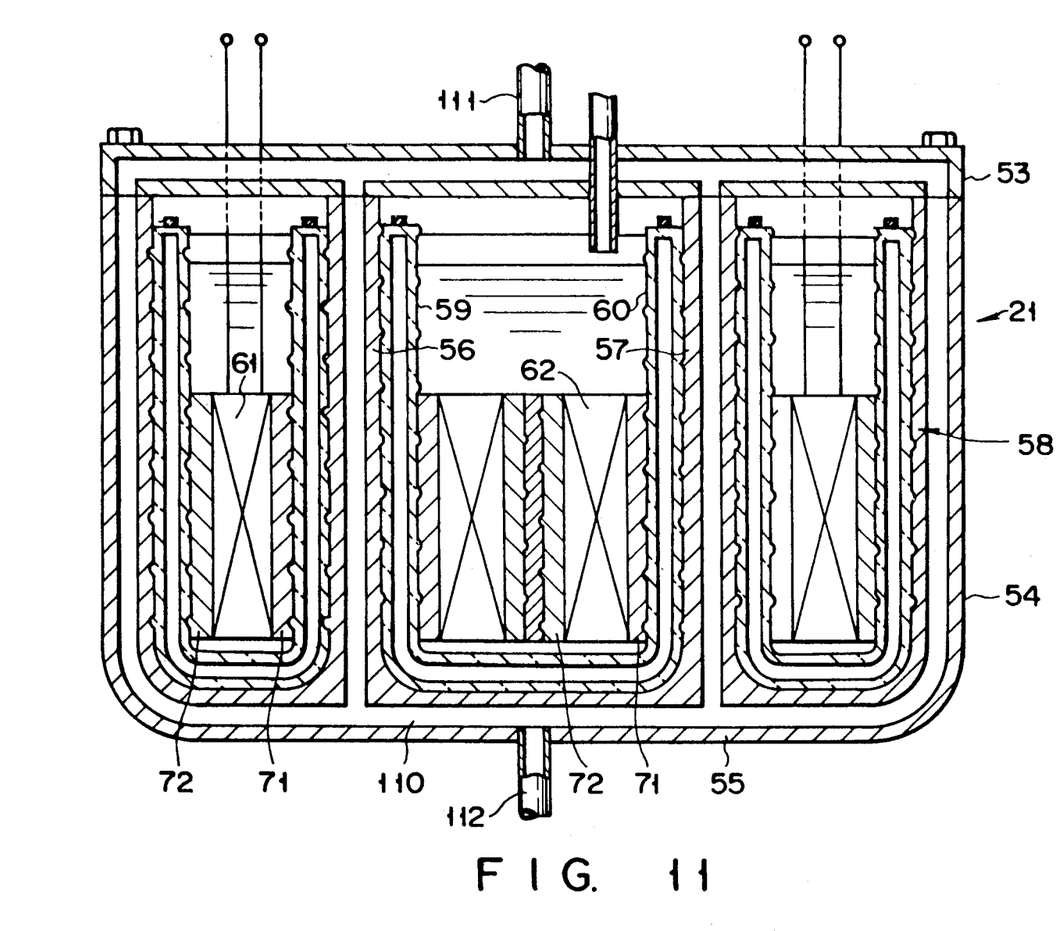
FIG. 11 is a sectional view illustrating yet another embodiment of the superconducting transformer of the present invention.

FIG. 11 illustrates another modification of the superconducting transformer of the present invention. According to this modification, two rods 56 and 57 are arranged between cover and bottom walls 53 and 55 and are magnetically coupled to them. Enclosure portions 59 and 60 of tank 58 are arranged around rods 56 and 57, respectively. Rod 56 and enclosure portion 59 are inserted into primary coil 61, and rod 57 and enclosure portion 60 are inserted into secondary coil 62.

Each of coils 61 and 62 comprises first and second cylindrical members 712 and 72, and each of these cylindrical members has screw portions. Further, each of main vessel 21, heat insulating tank 58, and rods 56 and 57 has screw portions. Therefore, tank 58 can be secured to main vessel 31, and coils 61 and 62 can be immovably secured to tank 58. If necessary, tank 58 can be easily detached from main vessel 21, and coils 61 and 62 can be easily detached from tank 58.

Further, refrigerant passage 110 is formed, for cooling rods 56 and 57, cover wall 53, and bottom wall 55.

What is claimed is:

1. A superconducting transformer comprising:
primary and secondary superconducting coils which are coaxial and made of superconducting wires;
a cryostat vessel containing refrigerant in which said coils are immersed, and thermally insulating the refrigerant from heat transmitted from the outside, so as to maintain said coils in a superconducting state, said cyrostat vessel having an annular side wall, a bottom wall, a cover wall, and a rod having two ends magnetically coupled with any one of the walls and inserted in said coils, all the walls and the rod being formed of ferromagnetic materials, so that all the walls and the rod form a closed magnetic circuit for said coils and serve as a core of said coils;

fixing/removing means for fixing said coils in said cryostat vessel to prevent said coils from moving by electromagnetic force thereof, and for removing said coils from said cryostat vessel; and said superconducting coils comprising, a first coil unit having a cylindrical first former on which first superconducting windings are formed, and a second coil unit disposed concentrically outside the first former and having a cylindrical second former on which second superconducting windings are formed, the second former being comprised of two former segments which are assembled into a cylindrical form;

wherein the first former comprises a first groove spirally formed in an outer surface thereof, superconducting wires of first windings are fitted in the first groove to form a spiral shape, and the first former comprises a first fluid passage formed on the outer surface thereof to permit the refrigerant to flow therethrough in a manner to come into contact with the superconducting wires of the first windings; and wherein the second former comprises a second groove spirally formed in an outer surface thereof, superconducting wires of the second windings are fitted in the second groove to form a spiral shape, each former segment has a plurality of recess portions formed in the outer surface thereof and defining the second groove when the former segments are assembled into the cylindrical form, and a second fluid passage is formed on the outer surface of the former segments to permit the refrigerant to flow therethrough in a manner to come into contact with the superconducting wires of the second windings.

2. A superconducting transformer according to claim 1, wherein said cryostat vessel comprises:
a main vessel formed of ferromagnetic material, and having the side, bottom and cover walls, and the rod; and
heat insulating means, arranged between the main vessel and the refrigerant, for thermally insulating the refrigerant from heat transmitted from all the walls and the rod of the main vessel.

3. A superconducting transformer according to claim 2, wherein said fixing/removing means comprises:
means for fixing said coils in relation to the heat insulating means to prevent said coils from moving by electromagnetic force thereof, and for removing said coils from the heat insulating means.

4. A superconducting transformer according to claim 2, wherein said fixing/removing means comprises:
means for screwing said coils to the heat insulating means.

5. A superconducting transformer according to claim 3, wherein said fixing/removing means further comprises:
means for guiding said coils with respect to the heat insulating means.

6. A superconducting transformer according to claim 2, wherein the rod is magnetically coupled with the bottom wall at the one end thereof and is magnetically coupled with the cover wall at the other end thereof.

7. A superconducting transformer according to claim 6, wherein the heat insulating means includes a heat insulating tank comprising:
an annular side portion disposed along the annular side wall of the main vessel;
a bottom portion disposed along the bottom wall of the main vessel; and
an enclosure portion enclosing the outer periphery of the rod, extended from the bottom portion, and inserted in said superconducting coils.

8. A superconducting transformer according to claim 7, wherein said fixing/removing means comprises:
two cylindrical members for fixing said coils to the annular side and enclosure portions to prevent said coils from moving by electromagnetic force thereof, and for removing said coils from the annular side and enclosure portions.

9. A superconducting transformer according to claim 8, wherein said fixing/removing means comprises:
means for screwing the cylindrical members to the annular side and enclosure portions.

10. A superconducting transformer according to claim 8, wherein said fixing/removing means further comprises:
means for guiding the cylindrical members with respect to the annular side and enclosure portions.

11. A superconducting transformer according to claim 1, wherein said cryostat vessel comprises:
cooling means for cooling the side, bottom and cover walls, and the rod by refrigerant.

12. A superconducting transformer according to claim 11, wherein said cooling means comprises:
a passage formed in the side, bottom and cover walls, and the rod to permit the refrigerant to flow therethrough.

13. A superconducting transformer according to claim 2, wherein said cover wall is detachably mounted on an upper opening of the main vessel.

14. A superconducting transformer according to claim 2, wherein the side and bottom walls, and the rod are formed integrally.

15. A superconducting transformer according to claim 2, wherein the ferromagnetic material for forming the side, bottom and cover walls, and the rod is silicon steel.

16. A superconducting transformer according to claim 1, wherein said cryostat vessel comprises two rods, each rod having two ends magnetically coupled with any one of the walls and inserted in said coil.

* * * * *